(12) United States Patent
Heo et al.

(10) Patent No.: US 11,828,320 B2
(45) Date of Patent: Nov. 28, 2023

(54) DEVICE FOR MOUNTING AN ELECTRONIC DEVICE TO A SMOOTH SURFACE WITH VACUUM SUCTION

(71) Applicant: Midwest Design Lab LLC, Newburgh, IN (US)

(72) Inventors: Yongjun Heo, San Francisco, CA (US); Tyler Efird, Nashville, TN (US)

(73) Assignee: Midwest Design Lab LLC, Newburgh, IN (US)

( * ) Notice: Subject to any disclaimer, the term of this patent is extended or adjusted under 35 U.S.C. 154(b) by 0 days.

(21) Appl. No.: 17/765,568

(22) PCT Filed: Nov. 13, 2020

(86) PCT No.: PCT/US2020/060454
§ 371 (c)(1),
(2) Date: Mar. 31, 2022

(87) PCT Pub. No.: WO2021/097239
PCT Pub. Date: May 20, 2021

(65) Prior Publication Data
US 2022/0412394 A1    Dec. 29, 2022

Related U.S. Application Data

(60) Provisional application No. 62/935,938, filed on Nov. 15, 2019.

(51) Int. Cl.
*H04M 1/04* (2006.01)
*F16B 47/00* (2006.01)
*F16M 13/02* (2006.01)

(52) U.S. Cl.
CPC ......... *F16B 47/006* (2013.01); *F16M 13/022* (2013.01); *H04M 1/04* (2013.01)

(58) Field of Classification Search
CPC ..... F16B 47/006; F16B 2/185; F16M 13/022; F16M 11/041; H04M 1/04
(Continued)

(56) References Cited

U.S. PATENT DOCUMENTS 2,871,054 A   1/1959  Zinke
8,066,238 B1  11/2011 Kuo
(Continued)

FOREIGN PATENT DOCUMENTS

CH            704327 A2   7/2012

OTHER PUBLICATIONS

"Float", Midwest Design Lab LLC. Nov. 12, 2020 (Nov. 12, 2020) (Online), [Retrieved on Jan. 5, 2021]. Retrieved From the Internet: <URL: https://web.archive.org/web/20201112031557/https://buyfloat.com/> Entire Document.

*Primary Examiner* — Terrell L McKinnon
*Assistant Examiner* — Jerry Olivier
(74) *Attorney, Agent, or Firm* — Martin IP Law Group; C. Richard Martin

(57) ABSTRACT

A device for mounting an electronic device to a surface comprising a main body, an electronic device holder, a mounting apparatus and a lever. The electronic device holder comprises a planar member affixed to the main body and holds the electronic device. The mounting apparatus is affixed to the main body, and securely attaches the device to the surface. The lever includes a first end pivotally attached to the main body and in communication with the mounting apparatus, and a second end for engagement by a user. The lever is movable from a first position where the lever is vertically oriented causing the mounting apparatus to engage the surface, and a second position where the lever is horizontally oriented and extends through a slot in the planar member of the electronic device holder into where the (Continued)

electronic device is mounted causing the mounting apparatus to release from the vertical surface.

13 Claims, 8 Drawing Sheets

(58) Field of Classification Search
USPC .............................. 248/206.2, 205.8; 269/21
See application file for complete search history.

(56) References Cited

U.S. PATENT DOCUMENTS

| | | |
|---|---|---|
| 8,348,216 B2 * | 1/2013 | Hajianpour ............. F16B 47/00 |
| | | 248/205.8 |
| 9,422,970 B1 | 8/2016 | Fan |
| 2008/0230662 A1 | 9/2008 | Takahashi et al. |
| 2010/0320341 A1 | 12/2010 | Baumann et al. |
| 2012/0049019 A1 | 3/2012 | Chen |
| 2014/0124553 A1 | 5/2014 | Cruz |
| 2016/0318455 A1 * | 11/2016 | Zhang ................ F16M 11/2021 |
| 2019/0162363 A1 | 5/2019 | Koch |

\* cited by examiner

DEVICE FOR MOUNTING AN ELECTRONIC DEVICE TO A SMOOTH SURFACE WITH VACUUM SUCTION

BACKGROUND OF THE INVENTION

Field of the Invention

The present invention relates to devices that can be removably mounted to flat smooth surfaces. More specifically, the present invention relates to devices for holding electronic devices such as tablets, e-readers, mobile phones and other small and hand-held electronic devices and removably mounting them to flat smooth surfaces with a vacuum suction cup.

Description of the Related Art

With the proliferation of cell phone, tablet and e-reader sales and usage, there has been a market to develop systems for mounting these devices to various surfaces. One such example is a suction cup cell phone holder that is configured to attach a cell phone to a car windshield. In devices such as this with an enhanced suction cup, the suction cup is first pressed against the glass surface and the device is held there by surface tension and a limited amount of suction. A lever is subsequently activated, pulling the center of the suction cup away from the surface while the periphery of the suction cup remains in contact with the surface. This creates a substantially stronger suction connection between the cup and the surface. Many of these devices are removably attached to a smooth surface such as glass by an enhanced suction cup. Various mechanisms are also provided for placing the mobile phone or device on the mount.

Since 2017, most flagship hand-held electronic devices sold by companies have been water resistant. The introduction of water resistant electronics has opened possibilities for individuals to take their hand-held electronic devices anywhere, such as the bathroom or shower. However, these devices have also become increasingly expensive. Although most devices are now water resistant, they are still fragile and susceptible to breakage if dropped on a hard surface from a height of more than a couple of feet.

In order to ensure the device is securely mounted to the surface, the lever must be actuated which pulls the center of the suction cup away from the surface creating additional suction. With the ever increasing cost of these devices, it is important to ensure that the suction is fully actuated before the expensive device is placed on the mount. None of the devices currently known to the inventor provides any means for ensuring such a suction cup is fully actuated before the device is placed on the mount. This could result in the entire mount pulling away from the surface due to the lack of a solid suction connection and the weight of the electronic device, possibly resulting in the suction cup coming loose from the surface potentially resulting in damage to the electronic device.

Accordingly, there is a need for a device that allows users to take their tablets, e-readers and hand-held electronic devices in places like the bath, vanity or shower and securely mount the electronic device therein, thus avoiding the risk of damage to the electronic device from being dropped onto a hard surface. There is further a need for a safety device that ensures that the suction cup is fully engaged with the mounting surface before the electronic device can be placed on the mount.

SUMMARY OF THE INVENTION

It is therefore an object of the present invention to provide a device for removably mounting an electronic device such as a tablet, e-reader, mobile phone or other hand-held electronic device to a smooth surface that has a strong, reliable and selectively removable attachment to the smooth vertical surface.

It is also an object of the invention to provide a device for removably mounting an electronic device to a smooth surface that has other mechanisms in place to ensure that the electronic device does not easily fall from the holder.

It is yet a further object of the invention to provide a safety mechanism whereby an electronic device cannot be placed in the holder until such time as the holder is safely and securely mounted to the vertical surface.

The present invention meets these objects by providing a device for mounting an electronic device to a smooth surface wherein the device includes a suction cup wherein a vacuum connection is created by way of a lever, a lip at the lower edge of the device holder that prevents the electronic device from sliding forward, and a safety lever that prevents the user from placing the electronic device on the holder until such time as the vacuum seal is created between the suction cup and the smooth surface.

According to one presently preferred embodiment of the invention, there is provided a device for mounting an electronic device to a substantially smooth surface comprising: a main body having a first end and a second end, an electronic device holder, a mounting apparatus and a safety lever. The electronic device holder comprises a substantially planar member affixed to the first end of the main body and configured to hold the electronic device. The mounting apparatus is affixed to the second end of the main body, and is configured to securely but removably attach the device to the substantially smooth surface. The safety lever includes a first enlarged end pivotally attached to the main body and in communication with the mounting apparatus, and a second free end for engagement by a user. The safety lever is movable from a first engaged position where the safety lever is substantially vertically oriented causing the mounting apparatus to securely engage the substantially smooth surface, and a second released position where the safety lever is substantially horizontally oriented and extends through a slot in the substantially planar member of the electronic device holder into an area where the electronic device would be mounted causing the mounting apparatus to substantially release from the substantially vertical surface.

The mounting apparatus may include a suction cup that is configured to engage the substantially smooth surface. The suction cup may be formed from a flexible polymer material, preferably selected from a group consisting of silicone, vinyl or polyurethane, and rubber. A rear surface of the suction cup may be attached to a first end of a rod which extends therefrom. The first enlarged end of the safety lever may be pivotally attached to a second end of the rod by a pivot pin which passes through a central opening in the first enlarged end of the safety lever, a corresponding opening in the second end of the rod, and a pair of openings in a pair of flanges extending outwardly from the main body. A periphery of the enlarged end of the safety lever includes a cammed surface which causes the rod and the center of the attached suction cup to be pulled away from the substantially smooth surface when the lever is moved to the first engaged position as a center region of the suction cup is drawn into a cavity in the main body.

The main body and the electronic device holder may be formed as a unitary body. The unitary main body and electronic device holder may be formed from a thermoplastic polymer, preferably one selected from the group consisting of acrylonitrile butadiene styrene (ABS), polyethylene, polycarbonate, nylon, polystyrene, or polypropylene.

The substantially planar member of the electronic device holder may comprise a substantially vertical back-rest member, and may further comprise a substantially horizontal shelf member extending from a lower edge of the back-rest member. Raised lips may be located at a free end of the substantially horizontal shelf member.

The electronic device holder may be oriented at an angle relative to the vertical plane so that the back-rest member leans slightly toward the substantially smooth surface. An upper edge of the electronic device holder may be tilted toward the substantially smooth surface at an angle of approximately 10 degrees when the device is mounted thereon.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
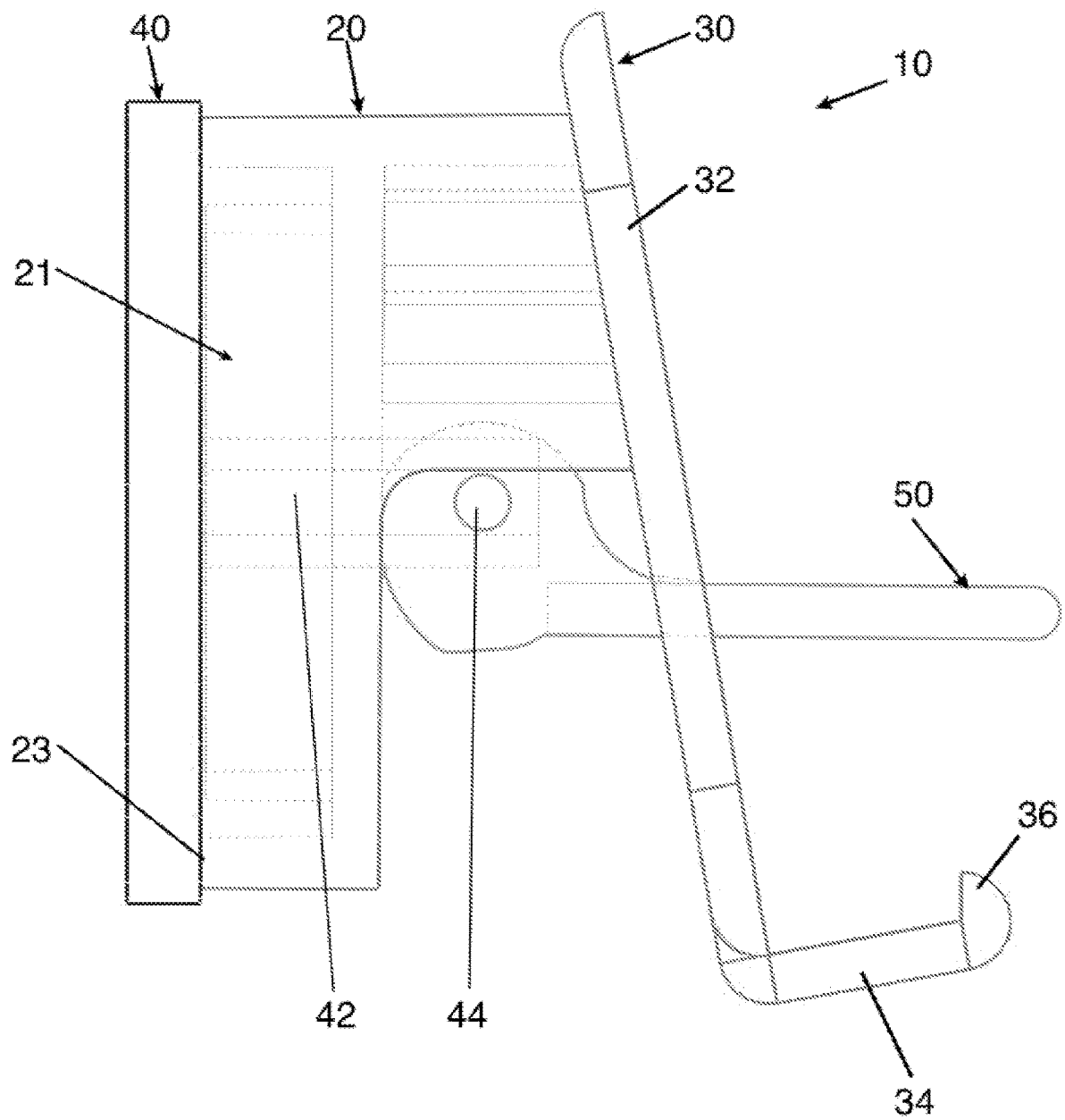
FIG. 1 is a side view in section of the device for mounting an electronic device according to a preferred embodiment of the invention, shown with the safety lever in an up position and the suction cup in the released position.
Figure 2:
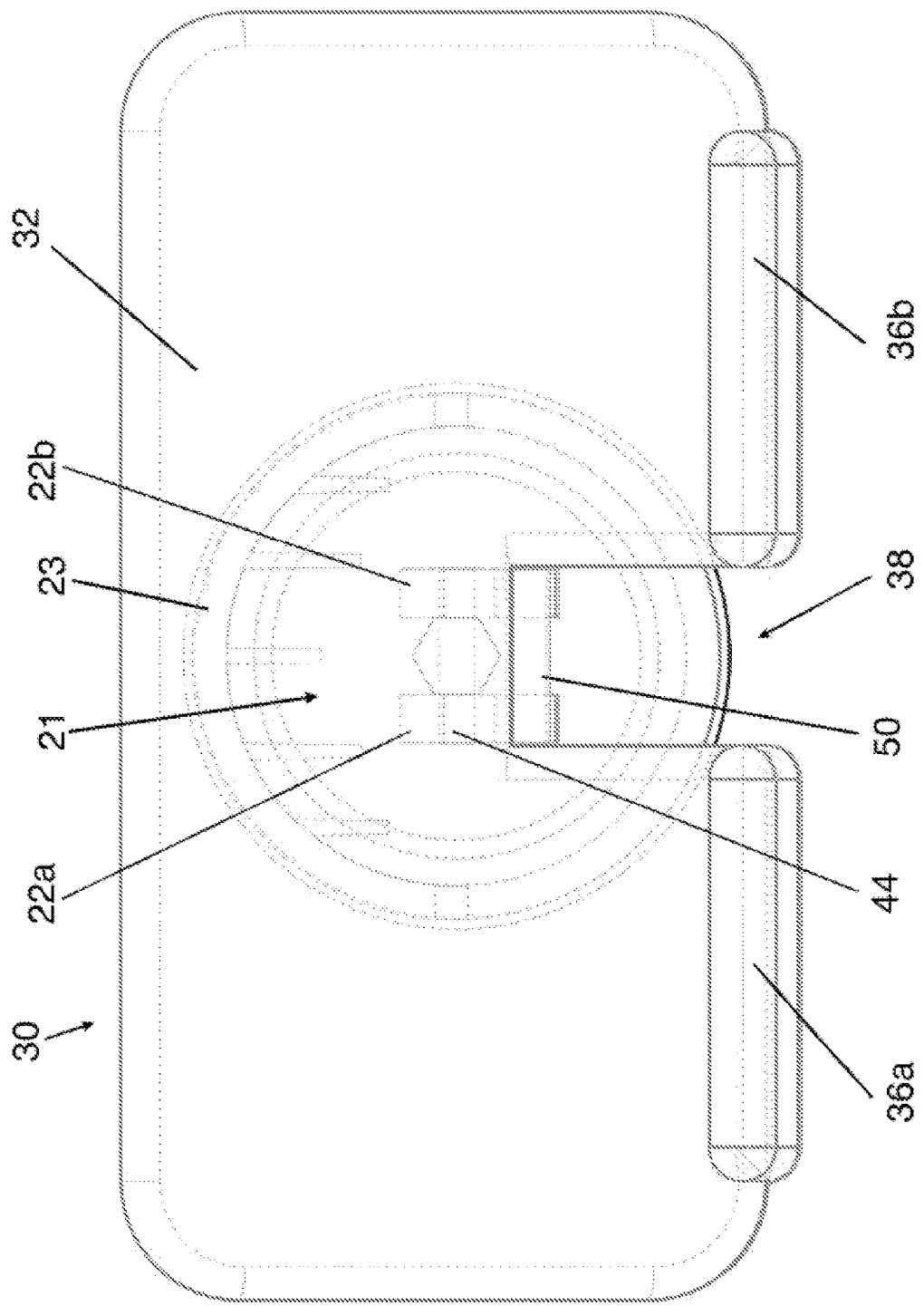
FIG. 2 is a front view in section of the device for mounting an electronic device shown in FIG. 1.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

As best shown in the accompanying drawings, one presently preferred embodiment of the invention comprises a mounting device 10 for holding an electronic device, such as a tablet, e-reader, mobile phone 100, or other small or hand-held electronic device. The mounting device 10 includes main body 20 having an electronic device holder 30 affixed to a first end thereof and a mounting apparatus such as a suction cup 40 attached to an opposing second end thereof. The mounting device 10 is designed to be securely but removably attached to a vertical surface by way of the suction cup 40. The electronic device holder 30 may be attached to the other end of the main body 20, or, as in the preferred embodiment shown, it may be a unitary body with the main body 20 of the mounting device 10. The electronic device holder 30 includes a substantially vertical back-rest member 32 and a substantially horizontal shelf member 34 extending from the lower edge of the back-rest member 32. Raised lips 36a, 36b are located at the free end of the substantially horizontal shelf member 34 to keep the hand-held electronic device 100 from sliding off the holder 30. The holder 30 is also oriented at an angle relative to the vertical plane so that the back-rest member 32 leans slightly toward the surface on which the device 10 is mounted by way of the suction cup 40. The size and shape of the back-rest member 32 and depth of the shelf member 34 are such that the holder 30 will accept most tablets, e-readers, cell phones and small or hand-held electronic devices. According to a presently preferred embodiment of the invention, the upper edge of the device holder 30 is tilted toward the vertical wall surface at an angle of 10 degrees. This degree of tilt maximizes the viewing angle while allowing the electronic device 100 to rest safely without falling forward. As will be readily apparent, angles other than 10 degrees may be used depending upon the anticipated placement of the device on a vertical surface and its vertical location relative to the user.

The device 10 is affixed to a smooth vertical surface by a suction cup 40 which is attached to safety lever 50 by a rod 42 and pivot pin 44 which passes through a central opening in the enlarged end of the safety lever 50, the rod 42, and flanges 22a, 22b in the body 20. A spring (not shown) may also surround the rod 42 to assist in the engagement and release of the suction cup 40. The periphery of the enlarged end of the safety lever 50 has a cammed surface which causes the rod 42 and the center of the attached suction cup 40 to be pulled away from the vertical surface when the lever 50 is moved to the down position as the center region of the suction cup 40 is drawn into a cavity 21 in the main body. This action generates a suction force similar to vacuum suction between the suction cup 40 and the vertical surface. In addition, the actuation of the lever 50 forces the body 20 against the back side of the suction cup 40 at the peripheral edge 23 of the body 20 further enhancing the vacuum effect.

Figure 3:
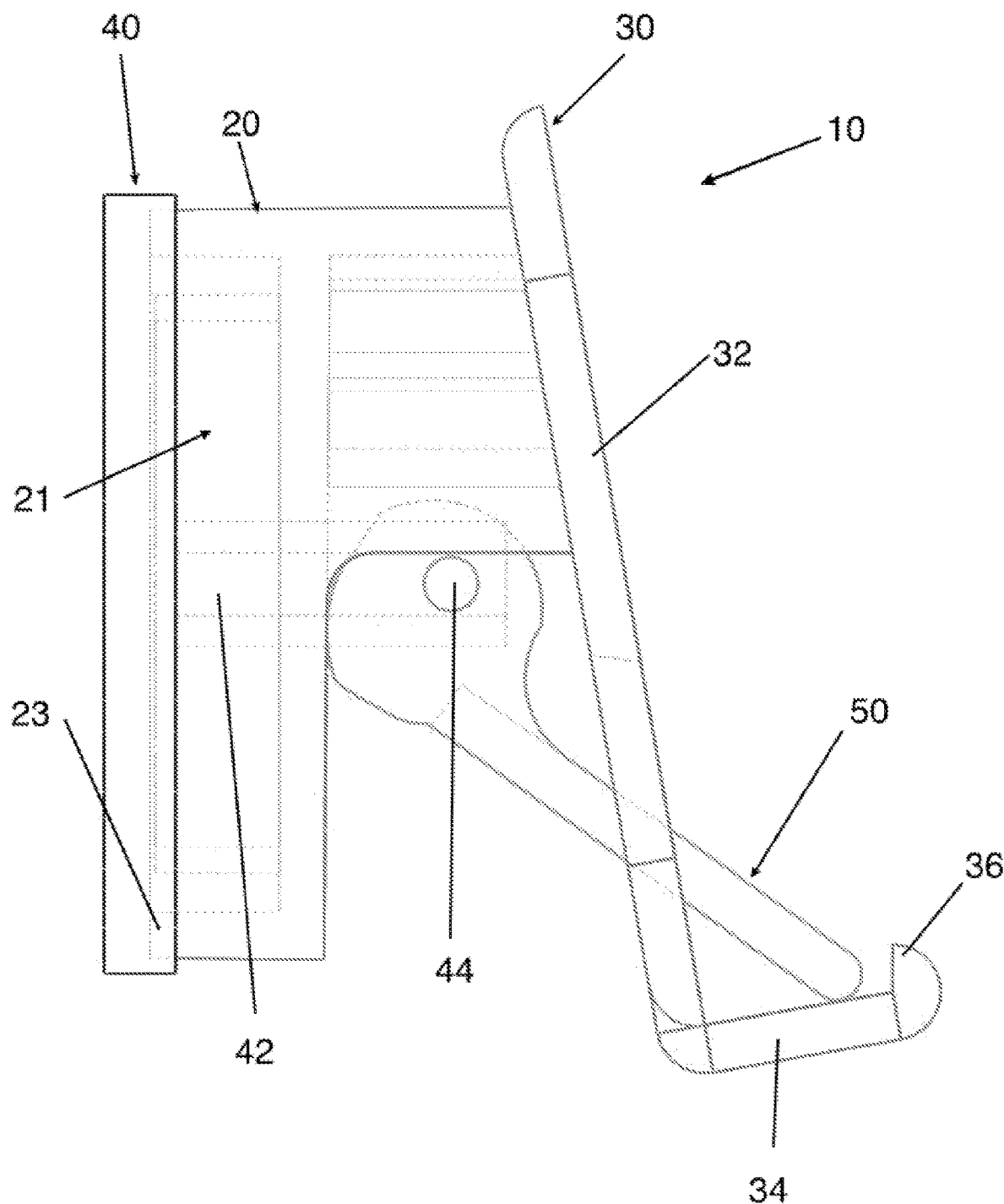
FIG. 3 is a side view in section of the device for mounting an electronic device as shown in FIGS. 1-2, with the safety lever shown in an intermediate position.
Figure 4:
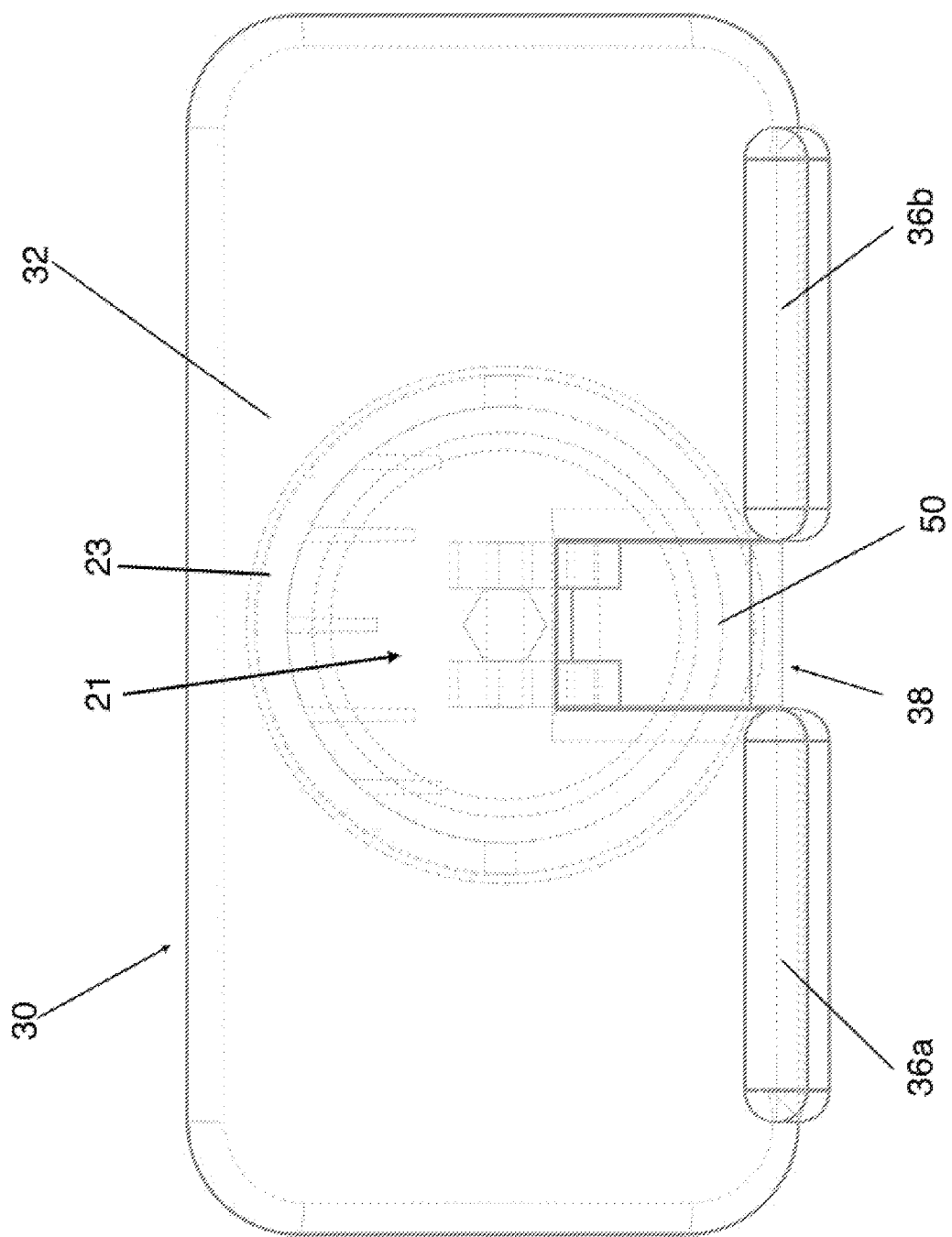
FIG. 4 is a front view in section of the device for mounting an electronic device shown in FIG. 3.
Figure 5:
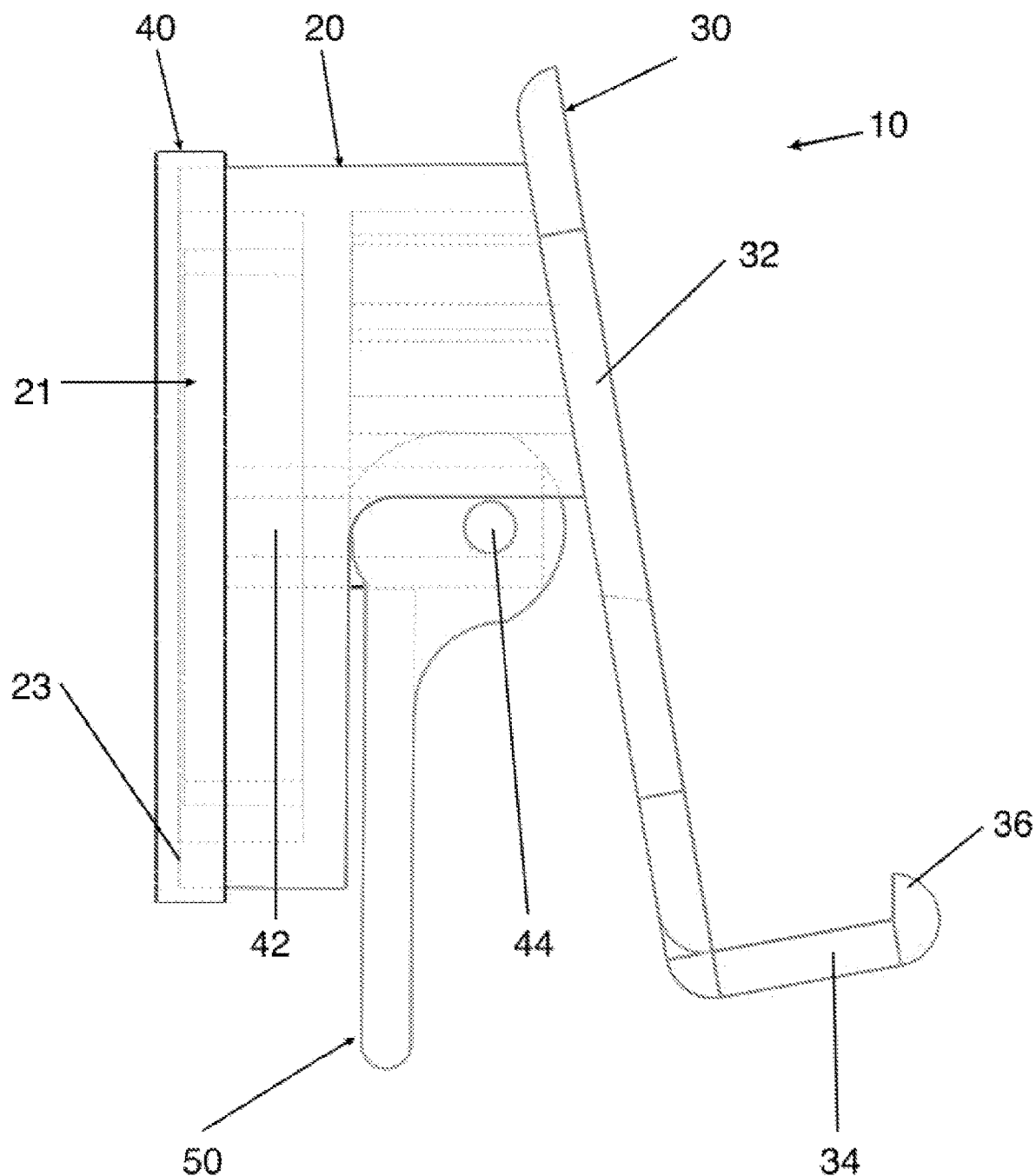
FIG. 5 is a side view in section of the device for mounting an electronic device according to a preferred embodiment of the invention, shown with the safety lever in the down position and the suction cup in the fully engaged position.
Figure 6:
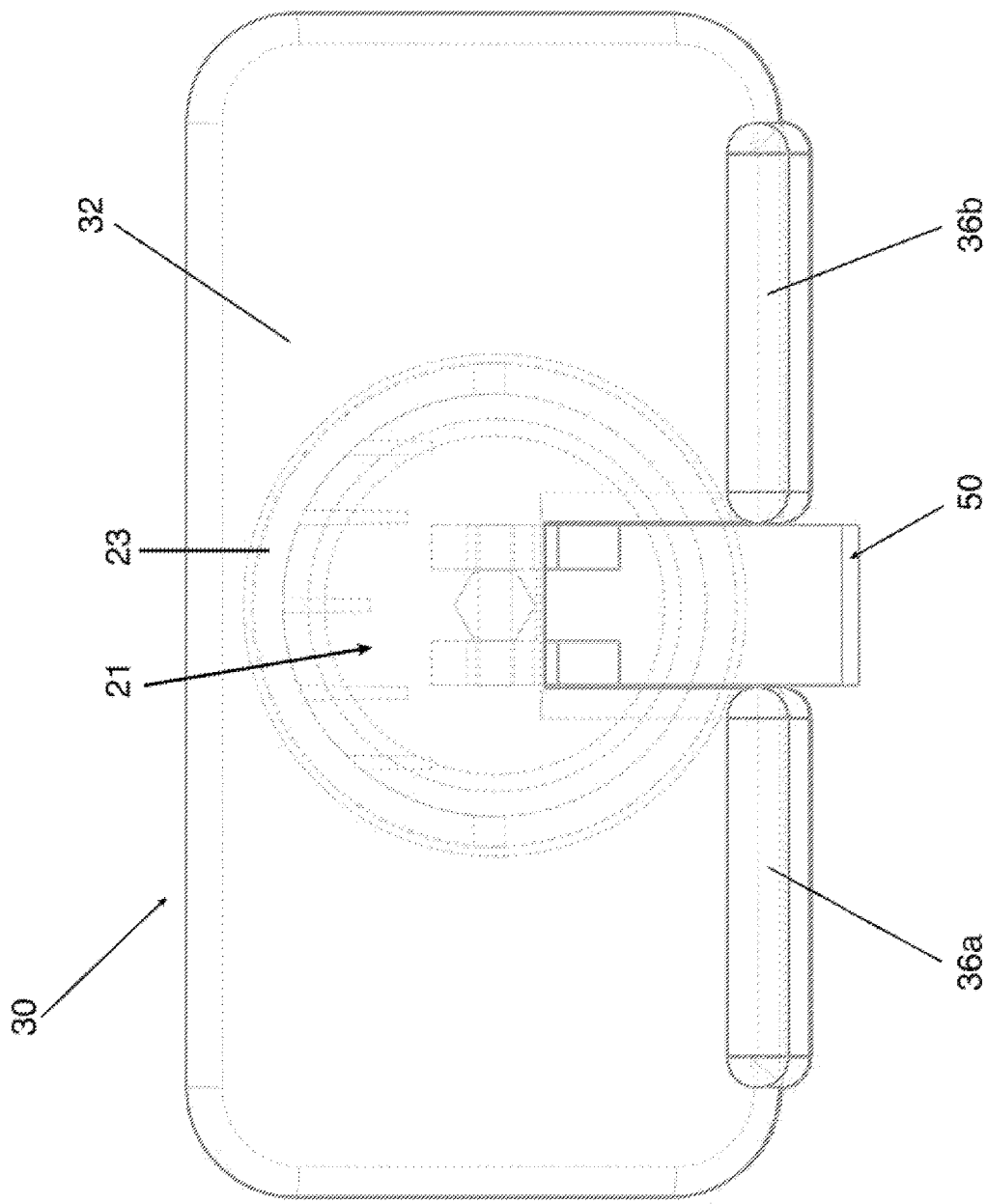
FIG. 6 is a front view in section of the device for mounting an electronic device shown in FIG. 5.
Figure 7:
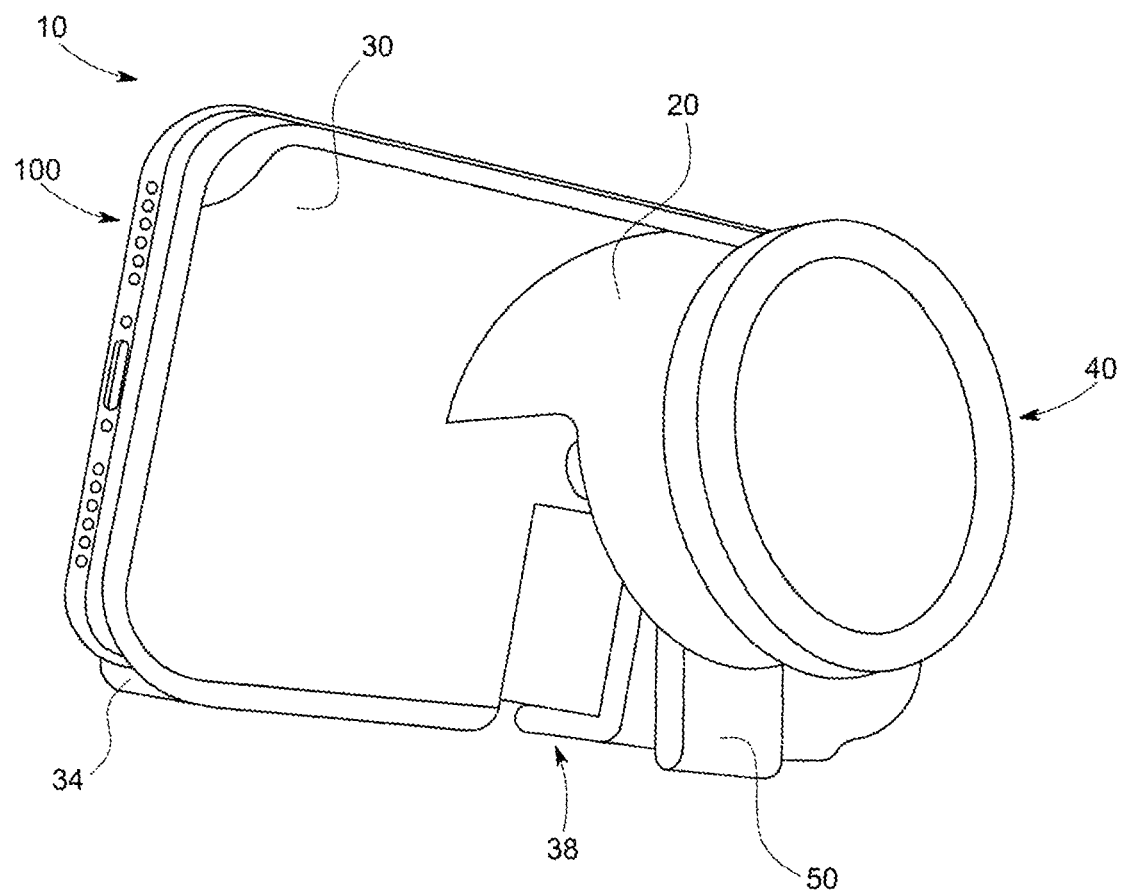
FIG. 7 is a rear perspective view of the device for mounting an electronic device according to a preferred embodiment of the invention.
Figure 8:
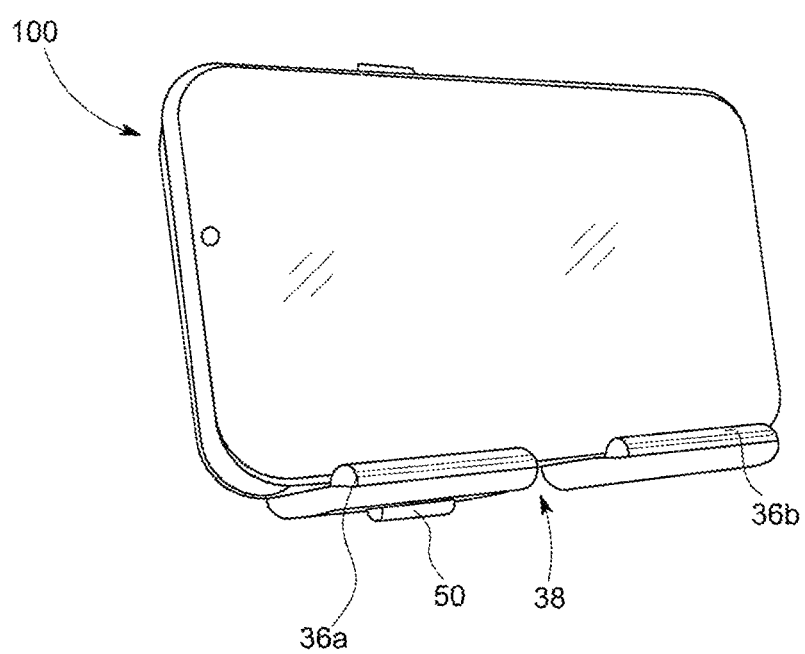
FIG. 8 is a front perspective view of the device for mounting an electronic device according to a preferred embodiment of the invention.

The device holder 30 includes a slot 38 in the center region thereof. The slot is sized and shaped to allow a safety lever 50 which controls the engagement and release of the suction cup 40 with the vertical surface, to pass therethrough. When the safety lever 50 is not fully actuated, as shown in FIG. 1 and FIG. 3, the free end of the lever 50 extends through the central slot 38 in the electronic device holder 30, effectively preventing an electronic device from being placed on the holder 30. This is an important safety feature of the present invention as it ensures that expensive hand-held electronic devices can only be placed in the holder 30 when the suction cup 40 is fully actuated as shown in FIG. 5.

Although the unibody main body 20 and device holder 30 can be made of any rigid material, according to a preferred embodiment of the invention, it is formed from a thermoplastic polymer such as acrylonitrile butadiene styrene (ABS), polyethylene, polycarbonate, nylon, polystyrene, or polypropylene. The safety lever 50 can be formed from the same material, or it can be formed from a different material. Similarly, the suction cup 40 can be formed from any flexible polymer material such as silicone, vinyl or polyurethane, or rubber. The suction cup 40 is designed to securely attach the device 10 to a number of different types of smooth vertical surfaces including glass, tile, mirror and metal.

The device 10 is attached to a vertical surface by first positioning the safety lever in the up position as shown in FIG. 1. The suction cup 40 is then pressed into contact with the vertical surface at the desired location. The safety lever 50 is then rotated from the up position, passing through the slot 38 in the device holder 30 to the down position shown in FIG. 5, which creates a vacuum suction connection between the suction cup 40 and the vertical surface. The electronic device 100 can now safely and securely be placed upon the substantially horizontal shelf member 34 and leaned against the substantially vertical back-rest member 32. The lip members 36a, 36b help to secure the electronic device on the device holder 30 effectively preventing the lower edge of the electronic device 100 from sliding forward.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A device for mounting an electronic device to a substantially smooth surface comprising:
    a main body having a first end and a second end;
    an electronic device holder comprising a substantially planar member affixed to the first end of said main body and configured to hold said electronic device;
    a mounting apparatus affixed to the second end of said main body, said mounting apparatus configured to securely but removably attach the device to said substantially smooth surface;
    a safety lever having a first enlarged end pivotally attached to the main body and in communication with the mounting apparatus, and a second free end for engagement by a user, the safety lever being movable from a first engaged position where the safety lever is substantially vertically oriented causing the mounting apparatus to securely engage the substantially smooth surface, and a second released position where the safety lever is substantially horizontally oriented and extends through a slot in the substantially planar member of the electronic device holder into an area where the electronic device would be mounted causing the mounting apparatus to substantially release from the substantially smooth surface.

2. The device for mounting an electronic device according to claim 1, wherein the mounting apparatus includes a suction cup that is configured to engage said substantially smooth surface.

3. The device for mounting an electronic device according to claim 2, wherein the suction cup is formed from a flexible polymer material.

4. The device for mounting an electronic device according to claim 3, wherein the flexible polymer material is selected from a group consisting of silicone, vinyl, polyurethane, and rubber.

5. The device for mounting an electronic device according to claim 2 wherein a rear surface of said suction cup is attached to a first end of a rod which extends therefrom, said first enlarged end of the safety lever is pivotally attached to a second end of said rod by a pivot pin which passes through a central opening in the first enlarged end of the safety lever, a corresponding opening in the second end of the rod, and a pair of openings in a pair of flanges extending outwardly from the main body.

6. The device for mounting an electronic device according to claim 5, wherein a periphery of the enlarged end of the safety lever includes a cammed surface which causes the rod and a center of the attached suction cup to be pulled away from the substantially smooth surface when the safety lever is moved to the first engaged position as a center region of the suction cup is drawn into a cavity in the main body.

7. The device for mounting an electronic device according to claim 1, wherein the main body and the electronic device holder are formed as a unitary body.

8. The device for mounting an electronic device according to claim 7, wherein the unitary main body and electronic device holder are formed from a thermoplastic polymer.

9. The device for mounting an electronic device according to claim 8, wherein the thermoplastic polymer is selected from a group consisting of acrylonitrile butadiene styrene (ABS), polyethylene, polycarbonate, nylon, polystyrene, or polypropylene.

10. The device for mounting an electronic device according to claim 1, wherein the substantially planar member of the electronic device holder comprises a substantially vertical back-rest member, and further comprising a substantially horizontal shelf member extending from a lower edge of the back-rest member.

11. The device for mounting an electronic device according to claim 10 further comprising raised lips located at a free end of the substantially horizontal shelf member.

12. The device for mounting an electronic device according to claim 10, wherein the electronic device holder is also oriented at an angle relative to the substantially smooth surface so that said back-rest member leans slightly toward said substantially smooth surface.

13. The device for mounting an electronic device according to claim 12, wherein an upper edge of the electronic device holder is tilted toward the substantially smooth surface at an angle of approximately 10 degrees when the device is mounted thereon.

\* \* \* \* \*